(12) United States Patent
Pandana

(10) Patent No.: US 7,038,665 B1
(45) Date of Patent: May 2, 2006

(54) INTEGRATED USB INPUT DEVICE

(75) Inventor: Jamin Pandana, Oak Park, CA (US)

(73) Assignee: NMB, U.S.A. Inc., Chatsworth, CA (US)

( * ) Notice: Subject to any disclaimer, the term of this patent is extended or adjusted under 35 U.S.C. 154(b) by 726 days.

(21) Appl. No.: 09/458,858

(22) Filed: Dec. 10, 1999

(51) Int. Cl.
*G09G 5/00* (2006.01)

(52) U.S. Cl. ..................... 345/168; 345/157

(58) Field of Classification Search ............. None
See application file for complete search history.

(56) References Cited

U.S. PATENT DOCUMENTS

| | | |
|---|---|---|
| 4,994,795 A | 2/1991 | MacKenzie |
| 5,073,771 A | 12/1991 | Satta et al. |
| 5,305,449 A | 4/1994 | Ulenas |
| 5,585,823 A | 12/1996 | Duchon et al. |
| 5,706,031 A | 1/1998 | Brendzel et al. |
| 5,805,143 A | 9/1998 | Myers |
| 5,831,597 A | 11/1998 | West et al. |
| 5,835,791 A | 11/1998 | Goff et al. |
| 5,847,695 A | 12/1998 | Duncan et al. |
| 5,884,086 A | 3/1999 | Amoni et al. |
| 5,936,555 A | 8/1999 | Zagnoev |
| 5,943,506 A | 8/1999 | Poisner |
| 5,991,546 A | 11/1999 | Chan et al. |

*Primary Examiner*—Xiao Wu
(74) *Attorney, Agent, or Firm*—Townsend and Townsend and Crew LLP

(57) ABSTRACT

An integrated input device communicates with a host computer system in accordance with the low-speed Universal Serial Bus (USB) Specification. The keyboard includes a function controller for providing output signals to a host computer or an upstream hub using a single USB low-speed cable and a USB type A connector. Signals generated by a pointing device are coupled to the appropriate pins of the function controller. The pointing device may be hard-wired to the function controller. Alternatively, the signals generated by the pointing device may be coupled to the function controller using a wireless technique, such as a radio frequency technique or an infrared technique.

2 Claims, 2 Drawing Sheets

INTEGRATED USB INPUT DEVICE

FIELD OF THE INVENTION

This invention relates generally to computer keyboards and, more particularly, to integrating a computer keyboard and another peripheral device, such as a pointing device.

BACKGROUND OF THE INVENTION

It is known in the prior art to couple a pointing device (e.g., a mouse or a trackball) to a keyboard in a computer system. For example, U.S. Pat. No. 5,305,449 to Ulenas ("the Ulenas '449 patent") discloses the combination of a keyboard 18, a pointing device 22 (i.e., a mouse or a trackball) and an adapter electronics circuit 32 which converts signals from a pointing device 22 into the cursor key codes of a keyboard 18. As is well-known in the art, when a key on the keyboard 18 is depressed, a switch closes, and encoder electronics of the keyboard 18 converts the switch closure into a key code and then transmits the key code to the host computer. The Ulenas '449 patent discloses extending the keyboard's encoder electronics to accept the signals from the pointing device 22 and to convert these signals into the corresponding cursor key codes of the keyboard 18 using the adapter electronics 32 incorporated therein. The Ulenas '449 patent discloses in FIG. 5 and the corresponding text incorporating the adapter electronics 32 into the keyboard 18, so that the pointing device 22 is coupled to the keyboard 18. The adapter electronics 32 converts the signals from the pointing device 22 into keyboard signals and passes the key codes from the keyboard 18 to the host computer. The encoder electronics 32 does not perform other functions, such as scanning the keyboard 18 or the pointing device 22 for data or formatting such data for subsequent transmission.

The combination disclosed in the Ulenas '449 patent effectively disguises the pointing device 22 to appear as the keyboard 18, and thus the combination is not suitable for use in a computer system that uses the Universal Serial Bus ("USB") Specification, which separately identifies each peripheral device according to a Human Interface Device ("HID") protocol. Indeed, the combination disclosed in the Ulenas '449 patent cannot operate in a USB environment. This is a significant drawback, since virtually all new personal computer systems include one or more USB ports, and the use of exclusively USB ports in computer systems is expected to dominate the interfacing of personal computer peripherals in the years to come. The USB Specification permits the personal computer to communicate with numerous peripheral devices through a single jack while always recognizing that each device is a separate device. No device need be disguised to appear as another device.

U.S. Pat. No. 5,831,597 to West et al. ("the West '597 patent") discloses in FIG. 9 the combination of a keyboard 366, a touch input device 372, and a mouse device 376 that are connected to a processor 362 by a Universal Serial Bus. A cable 378 provides a direct connection between the USB port 370 of the processor 362 and the keyboard 366. A cable 380 provides an extension of the USB between the keyboard 366 and the input device 372. A still further extension of the USB is a cable 375 which is connected to the mouse device 376. In the combination disclosed in FIG. 9 of the West '597 patent, the keyboard 366 must include a USB hub device. In accordance with the USB Specification, the USB hub device includes a hub controller which provides status, data, control functions for the Universal Serial Bus, and permits a USB host to access the hub device at upstream ports as well as at downstream ports on the Universal Serial Bus. Furthermore, in order for the mouse device 376 to be connected in series with the keyboard 366 and the input device 372 on the USB, the mouse device 376 must be "intelligent," i.e., the mouse device 376 must include its own microcontroller.

The West '597 patent illustrates the type of interfacing of peripheral devices that is contemplated by the USB Specification, i.e., a host computer 362 with a peripheral device (keyboard 366) that is a function/hub that includes within the peripheral device a USB hub device, a second peripheral device (touch input device 372) that is a second-tier function/hub device that includes within the peripheral device another USB hub device, and a function (mouse device 376) that includes a microcontroller. The USB hub devices that are included within the peripheral devices require connected functions to have their own microcontrollers. These hub devices facilitate the addition of more USB functions than may be practically needed.

As subsequent revisions of the USB Specification moves toward increased bit rates, USB ports will increase in cost. In Version 1.1 of the USB Specification, USB ports can be high speed (12.0 Mbits per second) or low speed (1.5 Mbits per second). The proposed Version 2.0 of the USB Specification sets forth bit rates of up to 240 to 480 Mbits per second. With respect to a USB-compatible computer keyboard, which typically includes a USB hub with two USB ports, a commercially significant consequence of an increase in the USB bit rate is the increased cost involved in integrating higher-speed USB ports into the keyboard. This is due primarily to the ancillary electronics that are necessary to support the higher-speed USB ports, particularly the filtering that is needed to ensure that the keyboard complies with various electromagnetic compatibility (EMC) requirements, which may be imposed by any of a number of sources including, for example, the U.S. Federal Communications Commission. As a general matter, then, the higher the speed of a USB port, the more expensive it is to integrate the USB port into a keyboard.

The trend, as evinced by the proposed Version 2.0 of the USB Specification, is toward higher USB bit rates. Keyboards that integrate therein the USB ports that will be required to support the higher bit rates will undoubtedly become more expensive, for the reasons detailed above. Consequently, there is a need in the art for a cost-effective input device that can be used in computers systems that are designed to operate in a high bit rate USB environment.

SUMMARY OF THE INVENTION

The present invention is directed to an apparatus that satisfies the need for a cost-effective input device for use in computer systems that are designed to operate in a high bit rate USB environment.

In accordance with an embodiment of the present invention, an input device for a computer system comprises: a keyboard which has a function controller for providing output signals for use in the computer system in accordance with a Universal Serial Bus technique, and a pointing device coupled to the function controller. The keyboard and the pointing device share the function controller.

The pointing device may be hard-wired to the function controller, or the pointing device may be coupled to the function controller using a wireless technique, for example a radio frequency technique or an infrared technique.

In accordance with another embodiment of the present invention, an input device for a USB compliant computer system comprises: a first peripheral device having a first function recognized by the computer system as a first function endpoint and a function controller for providing output signals for use in the computer system in accordance with a USB technique; and a second peripheral device recognized by the computer system as a second function endpoint coupled to the function controller. The first and second peripheral devices share the function controller.

The first peripheral device may be recognized by the computer system as a USB function. The second peripheral device may be dumb. The function controller may the only controller in the first peripheral device.

The above, and other features, aspects, and advantages of the present invention will become apparent from the following description read in conjunction with the accompanying drawings, in which like reference numerals designate the same elements.

DESCRIPTION OF THE PREFERRED EMBODIMENTS

Figure 1:
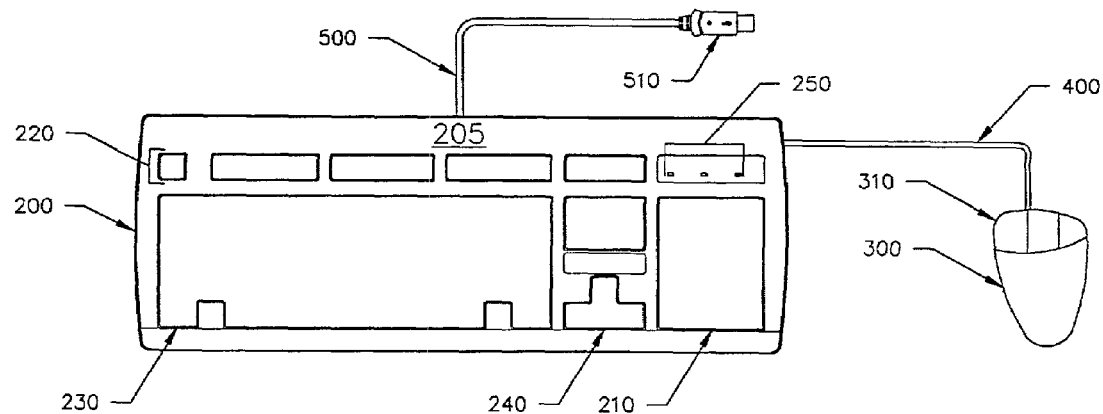
FIG. 1 is a top plan view of an embodiment of an integrated input device according to the present invention.

Referring now to FIG. 1, a preferred embodiment of an integrated input device according to the present invention is generally designated by the reference numeral 100. The input device 100 comprises a keyboard 200, a pointing device 300, and a cordset 400 for coupling the keyboard 200 and the pointing device 300.

The keyboard 200 includes the standard array of keys, generally designated by the reference numeral 205, that are typically provided on the keyboards that are supplied with most personal computers. The standard array of keys 205 consists of number pad keys 210, function keys 220, standard typewriter keys 230, and control keys 240. The standard typewriter keys 230 may include specific keys that are optimized for use with a particular computer, for example a personal computer operating the Windows 95® operating system or its successors. Additional keys, such as the Advanced Configuration and Power Interface ("ACPI") sleep and wakeup keys, application software launch keys, Internet application keys, and multimedia keys for CD-ROM, DVD, and audio applications, may also be included in the array of keys that are provided on the keyboard 200.

The keyboard 200 also includes an array of light emitting diodes 250, as is commonly present on personal computer keyboards, for indicating the status of operations such as number lock, caps lock, and scroll lock. Additional light emitting diodes 250 may be added to the diode array to indicate the status of any additional operations that may be added to the keyboard 200.

Except for those aspects of the present invention that are described further herein, the keyboard 200 of the present invention is generally of standard construction. The individual keys in the standard array of keys may be composed of either mechanical spring loaded keys or membrane mylar keys. When depressed, the keys of the keyboard 200 trigger a switch that is connected to a keyboard key matrix.

The pointing device 300 may comprise, for example, a mouse or a trackball. In a preferred embodiment of the present invention, the pointing device 300 is "dumb", meaning that the pointing device 300 does not incorporate a microcontroller, microprocessor, or other processing means, such as hardware or software, by which the quadrature (+X, −X, +Y, −Y) signals and the signals from the clicker switches 310 of the pointing device 300 are processed to determine the X-Y position of a cursor on the display of a user's host computer (not shown). Otherwise, the pointing device 300, like the keyboard 200, is of generally standard construction, and will not be described further herein.

The cordset 400 mechanically couples the pointing device 300 to the keyboard 200. In the preferred embodiment of the present invention that is illustrated in FIG. 1, the cordset 400 comprises eight or nine wires, four of which correspond to the quadrature (+X, −X, +Y, −Y) signals generated by the pointing device 300, two or three of which correspond to the clicker switches 310 of the pointing device 300, and the remaining two of which correspond to power and ground.

Figure 2:
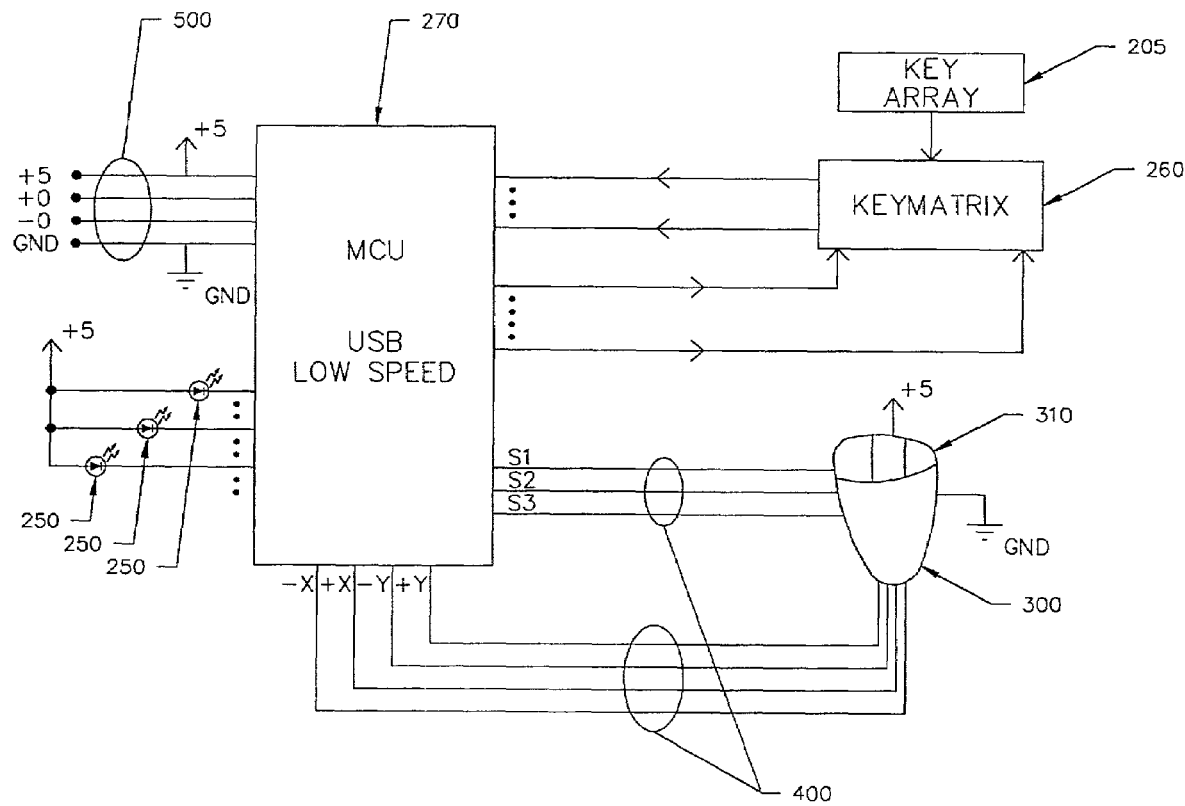
FIG. 2 is a block diagram of the circuitry used in the embodiment of the integrated input device of FIG. 1.

FIG. 2 illustrates a block diagram of the circuitry used to integrate the keyboard 200 and the pointing device 300 in the input device 100 shown in FIG. 1. The keyboard 200 includes a key matrix 260 which is coupled to a function controller 270. A function controller, as referred to herein, scans its associated peripheral device (such as the keyboard 200 or pointing device 300) for raw input data signals (such as the key-closure or key-open signals from the key matrix 260 of the keyboard 200, or the pointing device's quadrature signals or clicker switch signals) and converts these raw input data signals into USB low-speed data which is formatted as Human Interface Device ("HID") class data and is transmitted upstream, either to a hub or to the root hub of the host computer. In a preferred embodiment of the present invention, the function controller 270 comprises a general purpose microprocessor or an application specific integrated circuit (ASIC). For example, in a preferred embodiment of the present invention, the function controller 270 may comprise a microcontroller whose design is based on a general keyboard microcontroller (such as the Z86E18/U18 microcontroller manufactured by Zilog or the CY7C63413 microcontroller manufactured by Cypress Semiconductor), but is adapted to accommodate the quadrature signals and the signals from the clicker switches 310 of the pointing device 300.

The firmware of the function controller 270, which describes the integrated input device 100 to the host computer (not shown), identifies the presently preferred embodiment of the integrated input device 100 as a USB HID class, low-speed, bus-powered, composite device. Using the language of the USB Specification, the host computer (not shown) recognizes the input device 100 as a USB composite function (i.e., peripheral device) which has a first endpoint (i.e., an individually addressable section of a USB function) for the keyboard 200 and a second endpoint for the pointing device 300. In a preferred embodiment of the present invention, the function controller 270 is powered by a voltage in the range between approximately 4.40 volts and approximately 5.25 volts, and it consumes a current that is equal to approximately 100 milliamperes or less during normal operations.

As is known in the art, the function controller 270 contains Interface descriptors, Interrupt Endpoint descriptors, HID descriptors, and Report descriptors in accordance with the USB Specification, the Human Interface Device (HID) Specification, and the HID Usage Table. In a preferred embodiment of the present invention, the function controller 270 contains two sets of descriptors, one set for the keyboard 200 and one set for the pointing device 300. Thus, the function controller contains an Interface descriptor, an Interrupt Endpoint descriptor, an HID descriptor and a Report descriptor for the keyboard 200. The function controller 270 also contains an Interface descriptor, an Interrupt Endpoint descriptor, an HID descriptor and a Report descriptor for the pointing device 300. The function controller 270 also normally contains a single default control endpoint zero for the keyboard 200 and the pointing device 300.

The function controller 270 can be put into a "suspend" or "sleep" mode when the host computer (not shown) and its peripherals are placed in a suspend mode. Once in the sleep mode, the function controller 270 can resume normal operation (i.e., wake-up from the sleep mode) once any of the standard array of keys 205 of the keyboard 200 is depressed. The function controller 270 can also resume normal operation by detecting any movement from the pointing device 300, or by detecting when any of the clicker switches 310 of the pointing device 300 are depressed. The function controller 270 then sends a resume signal to the host computer (not shown) in order to command the host computer (not shown) and its peripherals to exit the suspend mode and thereby resume normal operation. In the suspend mode, the function controller 270 consumes a current that is equal to approximately 500 microamperes or less.

Each of the keys in the standard array of keys 205 is connected to the key matrix 260 which, in turn, is connected to the function controller 270. The function controller 270 receives input signals representing scan codes from the key matrix 260 and translates the input signals into the appropriate output signals to be transmitted to a host computer (not shown) according to the Universal Serial Bus format, in a manner that is known in the art.

In accordance with an embodiment of the present invention, the quadrature signals of the pointing device 300 and the signals from the clicker switches 310 of the pointing device 300 are also provided to the appropriate pins of the function controller 270. The function controller 270 translates the quadrature signals and the clicker switch signals into the appropriate output signals to be transmitted to a host computer (not shown) according to the Universal Serial Bus format, in a manner that is known in the art.

The function controller 270 communicates with an upstream hub or hubs (not shown) or a root hub of the user's host computer (not shown) as a USB low-speed, composite device through a single USB low-speed cable 500 and a USB type A connector 510 according to the USB Specification (for example, Version 1.1), the Human Interface Device ("HID") Specification (for example, Version 1.4), and the HID Usage Table. The cable 500 is a four-wire cable. In accordance with the USB Specification, two wires +D and −D transfer the data as a differential digital signal from the function controller 270 to the host computer (not shown).

Figure 3:
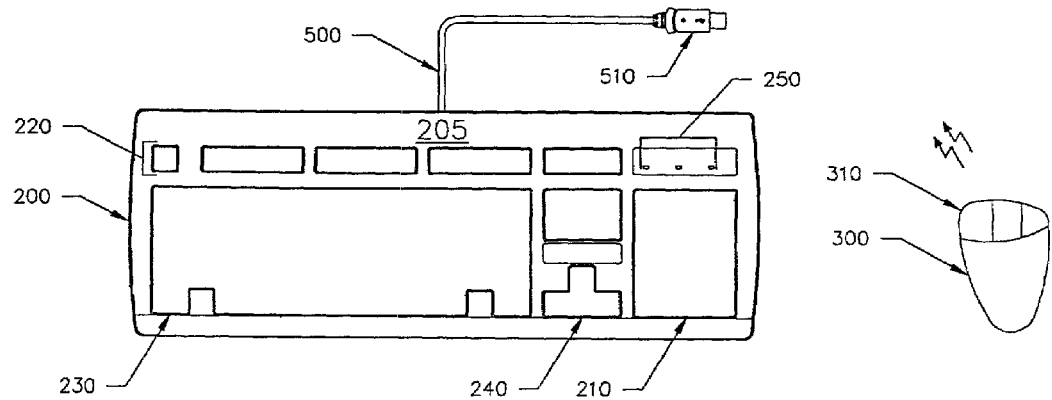
FIG. 3 is a top plan view of another embodiment of an integrated input device according to the present invention.
Figure 4:
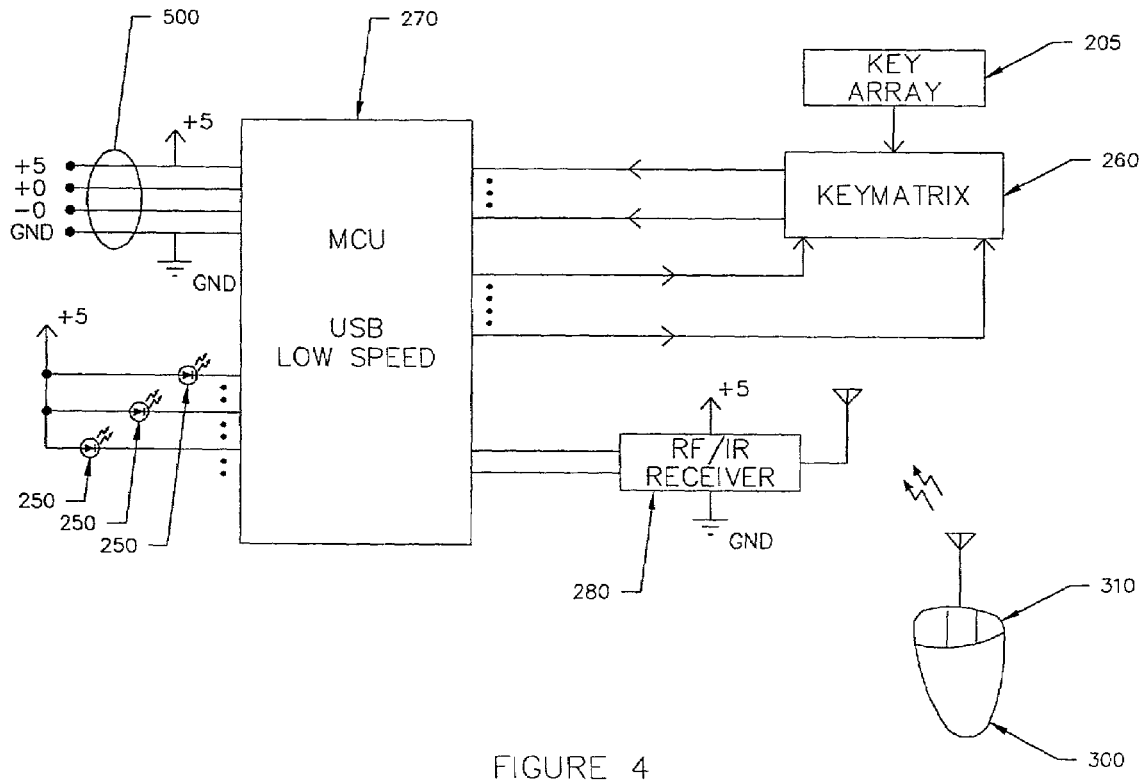
FIG. 4 is a block diagram of the circuitry used in the embodiment of the integrated input device of FIG. 3.

In an alternative embodiment of the present invention, illustrated in FIG. 3, the cordset 400 is eliminated and the keyboard 200 is coupled to the pointing device 300 either electrically through radio frequency (RF) communication or optically through infrared (1R) communication. FIG. 4 illustrates a block diagram of the circuitry used to integrate the keyboard 200 and the pointing device 300 in the embodiment of the input device 100 shown in FIG. 3. The quadrature signals and the signals from the clicker switches 310 of the pointing device 300 are transmitted as RF or IR signals to the RF/IR receiver 280 of the keyboard 200. The receiver may be an RF receiver, or an IR receiver, or both an RF and an IR receiver. The RF or IR signals are demodulated in the receiver 280 and are provided to the function controller 270. The function controller 270 translates the quadrature signals and the clicker signals of the pointing device 300 into the appropriate output signals to be transmitted to the host computer (not shown) directly or through an upstream hub according to the Universal Serial Bus format, in a manner that is known in the art.

The embodiments of the integrated input device 100 that have been described herein in accordance with the present invention advantageously provide a cost-effective USB input device. The integrated input device 100 according to the present invention uses a low-speed USB bit rate. By coupling the quadrature signals and the signals from the clicker switches 310 of the pointing device 300 to the function controller 270, the input device 100 requires only a single controller. Furthermore, coupling the pointing device 300 to the function controller 270 in accordance with the present invention also eliminates the need for the keyboard 200 to include a USB hub and, thus, one or more USB ports. As a result, the need to incorporate extensive support electronics into the keyboard 200 to provide filtering, for example, is significantly reduced. The result is an integrated USB input device that has a simplified construction, reduced material cost, and is cost-effective.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the peripheral devices that share the function controller need not be limited to a keyboard and a pointing device. Each peripheral device could also be any type of low-speed, low-power peripheral device, including but not limited to a touch pad, light pad, game pad, or a medical monitoring device, for example a blood pressure monitor or heart-rate monitor. More particularly, the second peripheral device could be any peripheral device desired to be integrated with a keyboard, such as any pointing device, touch pad, light pad, game pad, or a medical monitoring device, for example a blood pressure monitor or heart-rate monitor. The pointing device may be a mouse, a light pen, or a trackball.

What is claimed is:

1. An input device for a computer system, comprising:
a keyboard having a function controller therein for providing output signals for use in said computer system in accordance with a Universal Serial Bus technique;
a pointing device coupled to said function controller, said keyboard and said pointing device operate by sharing said function controller in said keyboard; and
wherein said function controller is the only controller in said keyboard.

2. The input device according to claim 1, wherein said pointing device is dumb.

* * * * *